US012753785B2

(12) United States Patent
Fabian

(10) Patent No.: US 12,753,785 B2
(45) Date of Patent: Oct. 6, 2026

(54) ASSEMBLY FOR NON-DETACHABLE CONNECTION OF PLASTIC PARTS FOR A CAR

(71) Applicant: HELLA AUTOTECHNIK NOVA S.R.O., Mohelnice (CZ)

(72) Inventor: Robert Fabian, Sumperk (CZ)

(73) Assignee: HELLA AUTOTECHNIK NOVA S.R.O., Mohelnice (CZ)

( * ) Notice: Subject to any disclaimer, the term of this patent is extended or adjusted under 35 U.S.C. 154(b) by 298 days.

(21) Appl. No.: 18/441,306

(22) Filed: Feb. 14, 2024

(65) Prior Publication Data

US 2024/0183374 A1 Jun. 6, 2024

Related U.S. Application Data

(63) Continuation of application No. PCT/EP2022/070948, filed on Jul. 26, 2022.

(51) Int. Cl.

| | |
|---|---|
| ***F16B 5/06*** | (2006.01) |
| ***B29C 65/58*** | (2006.01) |
| ***B29C 65/78*** | (2006.01) |
| ***B60Q 3/50*** | (2017.01) |
| ***F21S 41/19*** | (2018.01) |

(Continued)

(52) U.S. Cl.

CPC ............ *F16B 5/0664* (2013.01); *B29C 65/58* (2013.01); *B29C 65/7814* (2013.01); *B60Q 3/50* (2017.02);

(Continued)

(58) Field of Classification Search

CPC ....... B29C 65/58; B29C 65/7814; B60Q 3/50; F16B 5/065; F16B 5/0657; F16B 5/0664;

(Continued)

(56) References Cited

U.S. PATENT DOCUMENTS

| | | | | |
|---|---|---|---|---|
| 6,321,495 B1 * | 11/2001 | Oami | ..................... | B62D 25/06 428/14 |
| 6,345,946 B1 * | 2/2002 | Mainini | .................. | F16B 5/065 411/339 |

(Continued)

FOREIGN PATENT DOCUMENTS

| | | |
|---|---|---|
| DE | 2736012 A1 | 2/1978 |
| DE | 19533476 C1 | 3/1997 |

(Continued)

*Primary Examiner* — Josh Skroupa
(74) *Attorney, Agent, or Firm* — Husch Blackwell LLP

(57) ABSTRACT

An assembly for non-detachable connection of plastic parts for a car is provided. The assembly includes at least one set of pairs of complementary fastening elements. One element from each pair is rigidly connected to a first part, and a second element from the same pair is rigidly connected to a second part. The second element is at least partially inserted into the first element from the same pair. One element from each pair includes a protruding portion and a slot dividing the protruding portion into at least two segments. A second element from the same pair includes a recessed portion and a partition extending into the recessed portion. In each pair, the protruding portion is inserted into the recessed portion and the partition is inserted into the slot. The fastening elements further include protrusions and recesses for mutual engagement and connection of the parts to be connected.

8 Claims, 7 Drawing Sheets

(52) U.S. Cl.
CPC ......... *F21S 41/198* (2018.01); *F16B 2200/99* (2023.08); *Y10T 403/1624* (2015.01)

(58) Field of Classification Search
CPC ...... F16B 5/126; F16B 21/086; F16B 21/088; F16B 2200/99; F21S 41/198; H05K 5/15; Y10T 403/1616; Y10T 403/1624
USPC ...................................................... 403/13, 14
See application file for complete search history.

(56) References Cited

U.S. PATENT DOCUMENTS

| | | | | |
|---|---|---|---|---|
| 9,374,916 | B2 * | 6/2016 | Shimizu | H05K 5/15 |
| 10,833,571 | B2 * | 11/2020 | Esposito | F16B 5/0664 |
| 2015/0285455 | A1 * | 10/2015 | Sudahl | F21S 45/48<br>362/520 |
| 2017/0234349 | A1 * | 8/2017 | Cheng | F16B 21/086<br>403/359.6 |

FOREIGN PATENT DOCUMENTS

| | | | | |
|---|---|---|---|---|
| DE | 202019104488 | U1 * | 11/2020 | F16B 5/0664 |
| EP | 1437545 | A2 | 7/2004 | |
| EP | 2998644 | A1 | 3/2016 | |
| EP | 3372890 | B1 | 6/2021 | |
| FR | 2866083 | A1 * | 8/2005 | F16B 5/0664 |
| WO | WO-2010116939 | A1 * | 10/2010 | F16B 5/0664 |
| WO | WO-2010146023 | A1 * | 12/2010 | F16B 5/0664 |
| WO | 2020126615 | A1 | 6/2020 | |

* cited by examiner

ASSEMBLY FOR NON-DETACHABLE CONNECTION OF PLASTIC PARTS FOR A CAR

CROSS REFERENCE

This application claims priority to PCT Application No. PCT/EP2022/070948, filed Jul. 26, 2022, which itself claims priority to Czechian Application No. PV 2021-390, filed Aug. 20, 2021, the entireties of both of which are hereby incorporated by reference.

FIELD OF THE INVENTION

The present invention relates to the connecting of plastic parts in the car industry, which creates a non-detachable connection without the need for tools due to the use of fastening elements with special geometry located on the parts to be connected.

BACKGROUND OF THE INVENTION

In the current state of the art, the basic method of connecting plastic parts is to screw them together. Screw connections are typically used for attaching the inner trim, assembling the lamps or attaching them to the mounting hole in the car, attaching the radiator grille, etc.

Screw connections are preferable mainly due to their detachability, their disadvantage is the need for special screwdriving tools, the time required for screwing, the precision requirements for screwing, the need for fastening elements as separate parts that have to be inserted into the connection point before the screwing starts, etc. Coupling using screw connections is described, for example, in the document WO2020126615 A1, in which the parts to be connected are the components of a lamp module.

Some of the disadvantages of screw connections are eliminated in the state of the art by using specially shaped elements on the parts to be connected. These elements, for example, allow the relative position of the parts to be connected to be defined and, if necessary, hold the parts in the correct relative position for a short time, such that the operator does not have to worry about holding the parts together in the specified position. These elements can be, for example, pins and their complementary holes. Such a solution is described in the document EP3372890 B1.

In the document EP2998644 A1, the need for screw connections is completely eliminated by the geometry of the fastening elements, which are a fixed component of the parts to be connected, here a lens holder and radiator. In the solution of this document, the connection is made by threading hook-like elements through complementary holes and hooking them by moving them sideways. However, this connection may not be completely reliable and requires movement in two mutually perpendicular directions, which is not always possible when connecting components.

Therefore, it would be desirable to come up with a solution that would allow easy and reliable connection of plastic parts without the need for tools, and that would also ensure the correct relative position of the parts.

BRIEF SUMMARY OF THE INVENTION

The shortcomings of the solutions known from the prior art are to some extent eliminated by an assembly for the non-detachable connection of plastic parts for a car. The assembly comprises a plastic first part, a plastic second part, and a non-empty set of pairs of complementary fastening elements, wherein one element from each pair of complementary fastening elements is rigidly connected to the first part and the second element from the same pair is rigidly connected to the second part. One element of each pair of complementary fastening elements is adapted to be at least partially inserted into the second element of the same pair. Preferably, each element of the pair is partially insertable into the second element of the pair.

Further, one element of each pair of complementary fastening elements comprises a protruding portion and a slot dividing the protruding portion into at least two segments, each defined by at least one side surface or wall of the segment. The second element of the same pair comprises a recessed portion defined by at least one side surface or wall of a recessed portion and a partition extending into the recessed portion. In each pair of the complementary fastening elements, the protruding portion is adapted to be inserted into the recessed portion and the partition is adapted to be inserted into the slot. One element of each pair of complementary fastening elements comprises a protrusion on a side wall of the segment or a side wall of the recessed portion, and the second element of the same pair comprises a recess in a side wall of the segment or a side wall of the recessed portion complementary in shape to the protrusion, wherein the protrusion and the recess are adapted to connect the two elements of the pair by engaging the protrusion in the recess.

Some or all of the pairs may comprise a plurality of slots and complementary partitions, or the slot and/or partition may be branched so as to divide the given recessed/protruding portion into multiple segments.

The protrusion engaged in the recess forms a lock holding together the parts to be connected in a non-detachable manner. Preferably, each pair comprises at least one lock. The fact that the engagement of the protrusion into the recess holds together the fastening elements and the parts to be connected can be ensured, in particular, by the inclination of the walls of the protrusion and the recess, for example, by the fact that the wall of the protrusion/recess nearest to the free end of the fastening element with the protruding portion, and therefore also the corresponding wall of the complementary recess/protrusion on the second element of the same pair, is approximately perpendicular, e.g. 90°±30°, preferably ±15°, to the direction of insertion of the fastening elements into each other, i.e. the direction of moving the parts to be connected closer to each other. All the locks can have the same shape, but they can also be different. All the locks can lie in a common plane perpendicular to the direction of insertion after the parts have been connected.

The connecting of the first part to the second part is therefore carried out in such a way that both parts are oriented to each other such that one element from each pair of the complementary fastening elements is opposite to the second element from the same pair on the second one of the parts to be connected, wherein subsequently the parts to be connected are moved closer to each other. At a certain proximity, the fastening elements in each pair begin to be inserted into the second element in the pair, in particular, the protruding portion is inserted into the recessed portion and at the same time the partition is inserted into the slot. The moving of the parts to be connected closer to each other, and therefore also the insertion of the fastening elements into each other, ends when the protrusion or a plurality of protrusions on one or more fastening elements are aligned with the corresponding recess and the engagement of the protrusion(s) into the recess occurs.

Preferably, multiple, or more preferably all, protrusions will be engaged in the corresponding recesses at the same time. Preferably, the partition intersects the entire recessed portion and thus divides it into at least two segments of the recessed portion. The protrusions/recesses can be formed on the outer side of the protruding portion, but they can also be on the inner side facing the inside of the slot. The location of the lock can be different in each pair of the fastening elements.

Preferably, the first part and/or the second part is formed as a single part by casting, pressing, injection molding, etc., together with its corresponding fastening elements. Both the protruding portion and the recessed portion are protruding/recessed relative to the surrounding area of the part to be connected, but some portions of the part may be protruding relative to the protruding portion or recessed relative to the recessed portion. Preferably, the assembly comprises more than one pair of fastening elements, more preferably at least three.

In each pair of complementary fastening elements, the partition on one element of the pair is preferably further adapted to preload and mutually push apart at least two slot separated segments of the protruding portion of the second element from the pair. This can be achieved, for example, by narrowing the partition and/or the slot in the corresponding direction. This ensures that the partition abuts on the side walls of the segment of the protruding portion, so that any clearances in the shape of the fastening elements are defined and their connection is secured. Preferably, the segment preload is manifested by a force pushing the protrusion into the recess/the recess on the protrusion, thereby further securing the connection of the fastening elements.

Preferably, the set of pairs of complementary fastening elements comprises at least two pairs, wherein for any two pairs, the partition from one pair is rotated relative to the partition from the other pair about an axis parallel to the direction of insertion of the partition into the corresponding slot. This ensures, for example, that when the parts to be connected are mutually rotated into an improper position in which they are not to be connected, it is not possible to insert one partition into the slot of the fastening element with which the element containing the partition is aligned. This prevents improper connection of the parts in at least some improper position, preferably in all the improper positions, which reduces the demands on the attention of the operator and the subsequent inspection of any improperly connected parts, which is particularly preferable in the case of parts connected in a non-detachable manner.

Preferably, the set of pairs of complementary fastening elements comprises at least two pairs, wherein for some two pairs the partition from one pair has a different cross-section than the partition from the other pair, wherein the slot in at least one of the two pairs has a shape complementary to the shape of the partition in the same pair and non-complementary to the shape of the partition from the other of the two pairs. The above described incompatibility of the parts in an improper position can therefore be achieved not only by rotating the partitions but also by changing their shape. For example, one partition may be wider than another, either along its entire length or just a portion of it, or it may be wider in some places and narrower in others. For example, it is also possible to use a curved partition, an "L"- or "T"-shaped partition, etc.

It is particularly advantageous that the first part and the second part are adjustable to just one mutual position in which the partition from each pair of complementary fastening elements can be inserted into a complementarily shaped and oriented slot of some pair of complementary fastening elements. This ensures that there is less room for operator/worker error. The adjustability to a single correct position prevents workers from connecting the plastic parts in the wrong orientation, so workers do not have to carefully monitor this orientation at work and do not need to check it afterwards. The demands on the workers and the time required for connecting the parts are thus reduced. Preferably, the improper assembly is prevented in positions obtained by rotating the part to be connected in the correct orientation relative to the other part about an axis parallel to the direction of insertion/connection. Preferably also in positions obtained by rotation around axes perpendicular to the direction of insertion/connection, especially if the parts to be connected can be connected even in this position.

This connectivity in a single, correct position, or incompatibility in incorrect positions, can be achieved, for example, by means of the shapes and/or rotation of the partitions as described above. Instead of the shape of the partitions and slots or their rotation, it is possible to use other portions of the fastening elements in different pairs of different shapes, e.g., the outer circumference of the protruding portion, or a different number or shape of the segments. It is also possible to ensure the connectivity of the two parts in only one of their mutual orientations by arranging the fastening elements, e.g., in positions representing the vertices of an irregular, preferably asymmetric, polygon when viewed in the direction of insertion. The arrangement of the fastening elements can also ensure connectivity in a single position for example by placing the fastening elements from different pairs in different positions in the direction of insertion. In addition to the fastening elements, the shape of the parts to be connected, in portions other than in the fastening elements, can also ensure this correct connectivity.

At least one of the first and second part can be a component for the car's lamp. For example, the first part may be a lamp cover and the second part may be portion of the car body where the lamp is to be installed. Both parts can be part of the lamp, e.g., lens holder and lamp cover, lens holder and lens frame, lamp module cover and lamp cover, transparent cover glass and opaque module or lamp cover, etc. In addition, it may be any other plastic component of the car, such as a part of the trim, dashboard, mirrors, bumper, radiator grille, etc. For example, the first part may be a lens holder and the second part may be a lamp lens frame.

Preferably, the partition in at least one pair passes across the recessed portion and divides it into at least two segments. The partition is then secured at both ends in the wall of the recessed portion such that the risk of its deformation or damage is reduced.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

The invention will be further clarified using exemplary embodiments with reference to the respective drawings.

Figure 1:
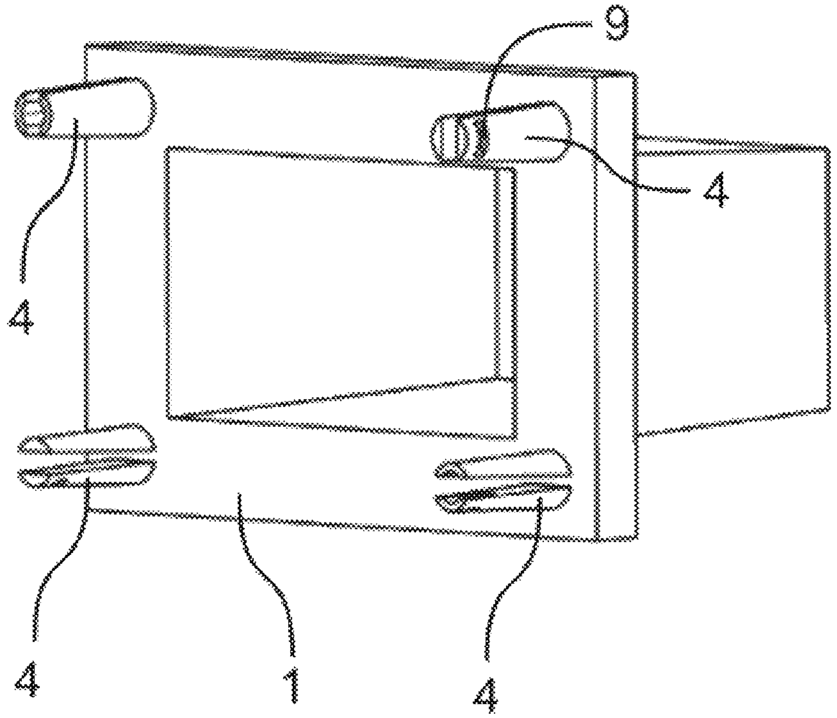
FIG. 1 shows schematically in a perspective view a first part of an exemplary embodiment of an assembly for the non-detachable connection of plastic parts for a car of the present invention, wherein in this embodiment the first part is an exemplary lens holder provided with four fastening elements with a protruding portion.
Figure 2:
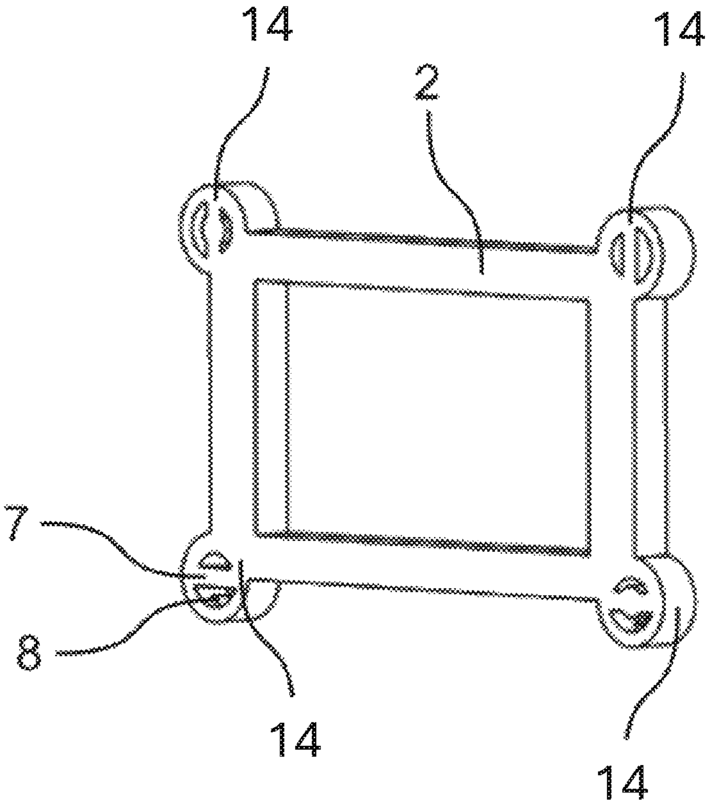
FIG. 2 shows schematically in a perspective view a second part of the assembly of the invention, which is in the embodiment shown an exemplary frame for a lens mounted in a lens holder, wherein this frame comprises four fastening elements with a recessed portion, each complementary to one of the fastening elements of FIG. 1.

The object of the present invention is an assembly for the non-detachable connection of plastic parts, in particular for the car industry. This assembly comprises, in the embodiment shown, a first part 1 and a second part 2 which are parts to be connected, wherein the first part 1 is an optical lens holder for a lamp (see FIG. 1) and the second part 2 is a frame for this lens (see FIG. 2). In alternative embodiments, the assembly may also comprise other components, such as a third part placed between or attached to the first part 1 and the second part 2, either by the same fastening elements 4, 14 that connect the first part 1 to the second part 2, as will be described below, or by another method of connecting, such as welding, gluing, screwing, etc.

The assembly of the invention comprises a set of pairs 3 of complementary fastening elements 4, 14, wherein this set comprises at least one pair 3, preferably at least two pairs 3, and even more preferably at least three pairs 3, to ensure a reliable and unambiguous connection of the parts to be connected. In the embodiment shown, the assembly comprises four pairs 3. Each pair 3 comprises one fastening element 4, which is a fixed component of the first part 1, and one fastening element 14, which is a fixed component of the second part 2. One element of each pair 3 is adapted to be inserted into the other by at least a portion of its volume, in the embodiment shown the elements 4 on the first part 1 are intended to be inserted into the corresponding elements 14 on the second part 2. At the same time, however, a portion of each element 14 on the second part 2 is located inside the element 4 on the first part 1 after the insertion of one fastening element 14 into the other element 4.

In each pair 3 in the embodiment shown, the fastening element 4 on the first part 1, hereinafter referred to as the first element, is implemented as an element with a protruding portion in the shape of a conical cone divided into two segments 6 by a slot 5. This cone is fixed by its larger base to the first part 1 and the smaller base represents the free end of the first part for insertion into the corresponding complementarily shaped fastening element 14 on the second part 2, hereinafter referred to as the second element. The slot 5 narrows towards the larger base.

The second element 14 of each pair 3 is implemented as an element with a recessed portion, in the embodiment shown the recessed part is a through hole passing through the second part 2, but alternatively it does not have to be through. In alternative embodiments, the second element 14 does not have to be aligned with the surface of the second part 2 but may also protrude therefrom, i.e., may for example comprise walls defining said recessed portion, wherein these walls protrude from the surface of the second part 2. Similarly, in some embodiments, the protruding portion may be recessed below the surface of the part to be connected or may protrude relative to the bottom of a recess formed in this part.

The recessed portion is also divided into two segments 16 by a partition 7 which intersects the recessed portion. Each of the segments 6 of the first element 4 thus fits into and is intended to be inserted into one of the segments 16 of the second element 14, wherein the partition 7 is then at the same time inserted into the slot 5. In the embodiment shown, each fastening element 4, 14 has exactly two segments 6, 16 but in other embodiments it may have three or more than three segments 6, 16. Preferably, the number of segments 6 on the first element 4 corresponds to the number of segments 16 on the second element 14 from the same pair 3, but embodiments where this number is different are also possible.

The partition 7 has a constant cross-section throughout its depth/height in the embodiment shown. Thanks to the narrowing cross-section of the slot 5, pressure is gradually exerted on the side walls of the segments 6 defining the slot 5 when the fastening elements 4, 14 are inserted into each other by the partition 7. Both segments 6 of each first element 4 are thus pushed apart and thus tensioned. This eliminates any clearance between the two fastening elements 4, 14 from the same pair 3 such that the connection between the first part 1 and the second part 2 is precise and vibration-free. In addition, the pressure between the partition 7 and the walls of the slot 5 helps to hold the fastening elements 4, 14 together.

Figure 5:
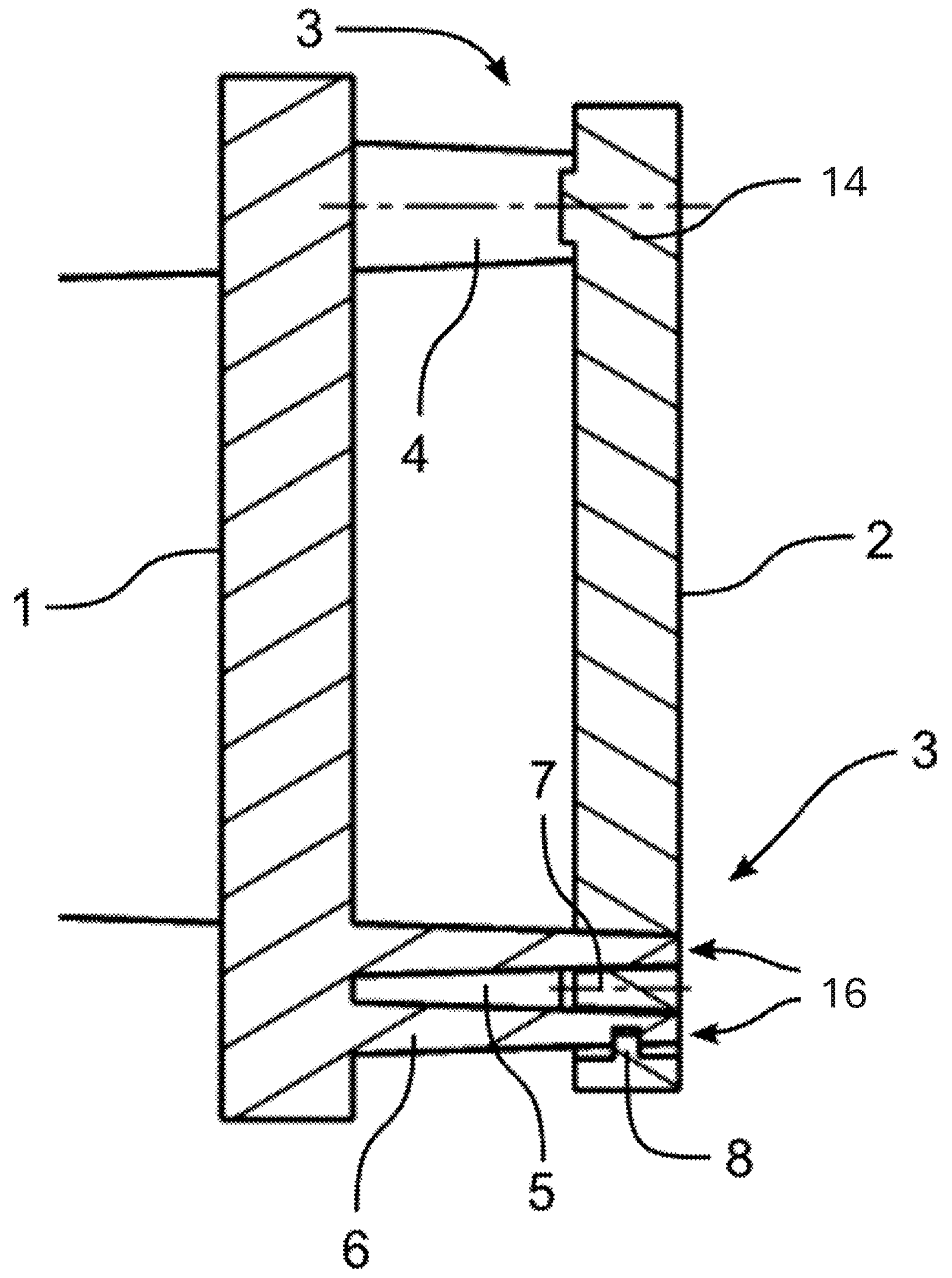
FIG. 5 shows schematically a B-B section indicated in FIG. 3, wherein this section is through two other adjacent pairs of complementary fastening elements.

However, the main mechanism which holds the fastening elements 4, 14 together when inserted into each other, and which makes the assembly of the invention an assembly for non-detachable connection, is a lock on each pair 3 implemented as a protrusion 8 on the side wall of a segment 6, 16 of one of the elements 4, 14 from each pair 3 and a complementary recess 9 on the side wall of a segment 6, 16 of the other element 4, 14 of the same pair 3. The shape of the protrusion 8 and thus the shape of the recess 9 is chosen such that during the insertion it is possible to push the fastening elements 4, 14 completely into each other with a reasonable force, wherein at the end of this insertion the protrusion 8 is aligned with the recess 9, the protrusion 8 engages the recess 9, and neither the protrusion 8 may fall out spontaneously nor the protrusion 8 may fall out of the recess 9 in a non-destructive manner to disconnect the connected parts. The form of the lock on one pair 3 is best seen in FIG. 5, where it can be seen that both the protrusion 8 and the recess 9 are rectangular in cross-section. The perpendicularity of the side of the protrusion 8 and the recess 9 closer to the free end of the protruding portion with respect to the direction of insertion and withdrawal of the first element 4 from the second element 14 prevents the lock from disconnecting. The protrusions 8 and recesses 9 prior to the connection of the fastening elements 4, 14 can be seen in detail in FIGS. 8 to 15.

Figure 3:
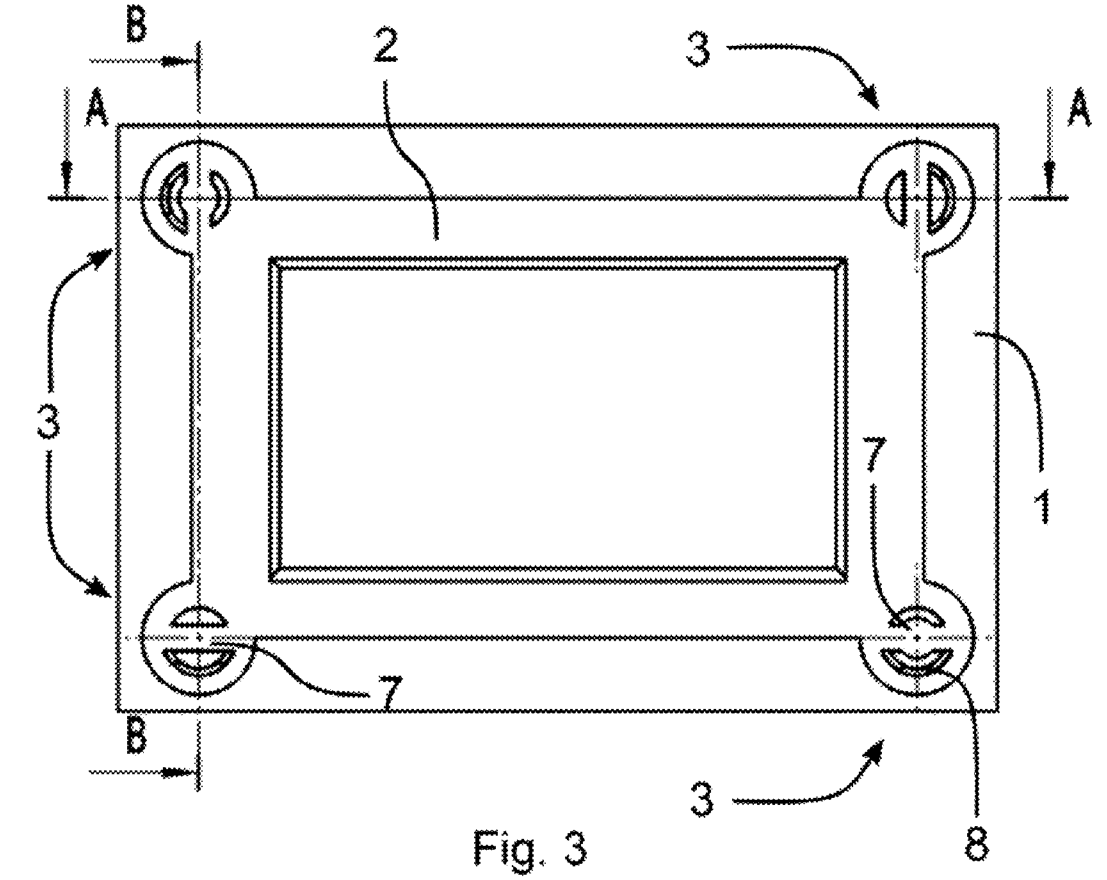
FIG. 3 shows schematically a rear view of the assembly of the invention comprising the connected first part and second part of FIGS. 1 and 2.
Figure 6:
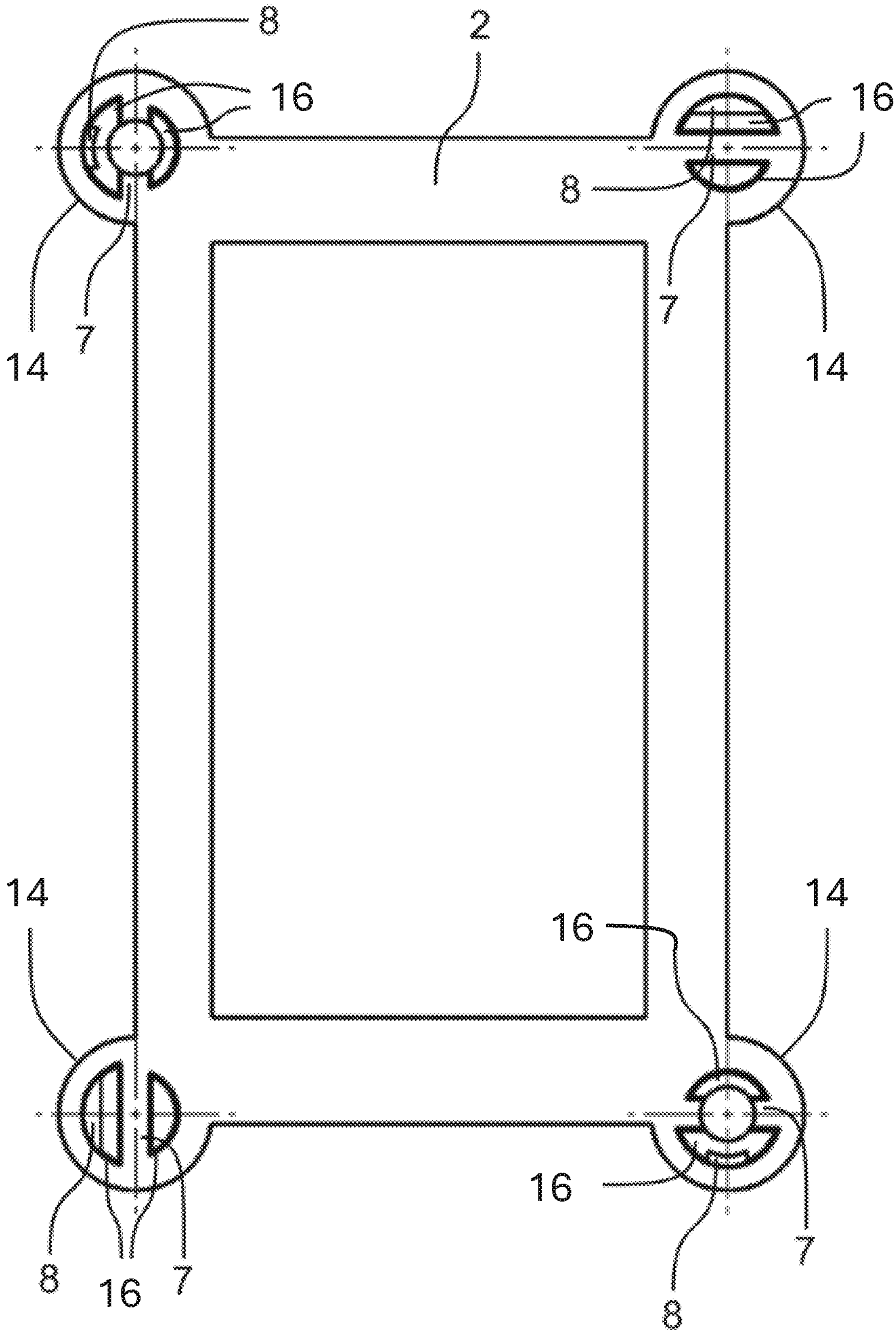
FIG. 6 is a more detailed rear view of the lamp mounting frame of FIG. 2.
Figure 7:
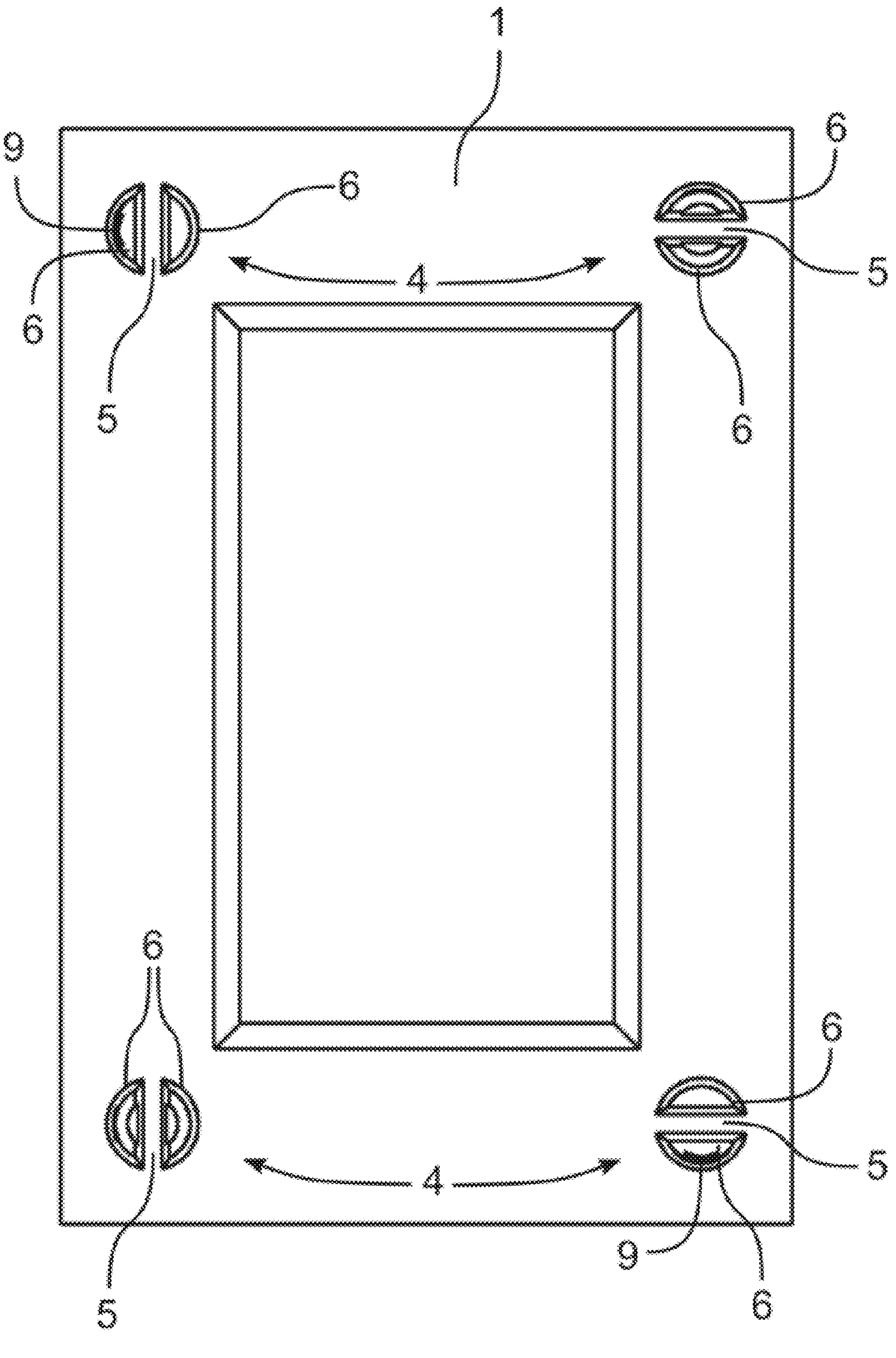
FIG. 7 is a more detailed rear view of the lens holder of FIG. 1.
Figure 8:
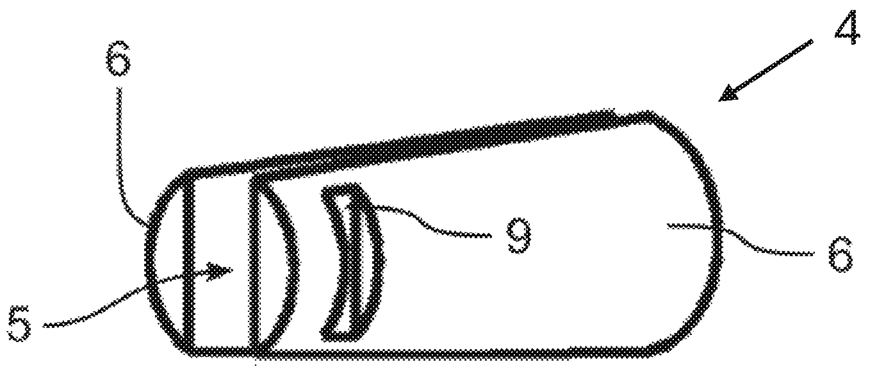
FIG. 8 schematically indicates a detailed perspective view of one of the fastening elements of FIG. 1, wherein this element comprises a protruding portion with a slot adapted for inserting a partition with a constant width.
Figure 9:
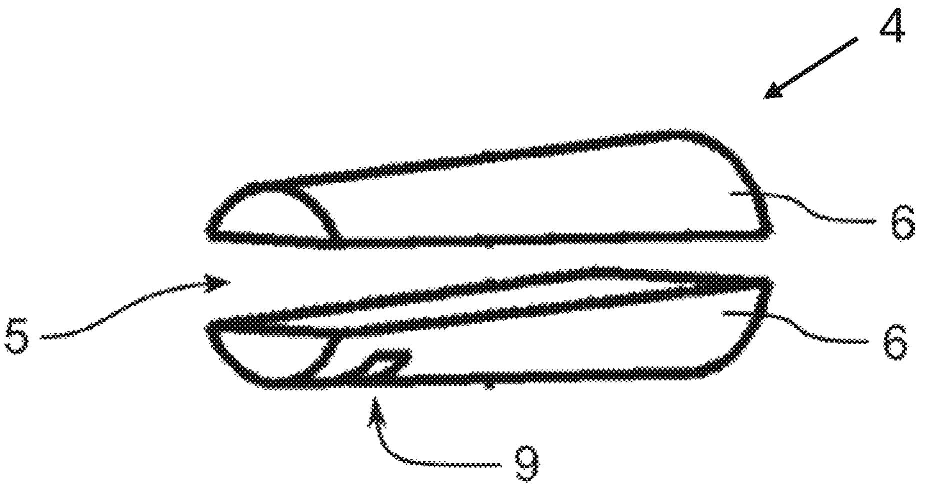
FIG. 9 is a perspective view from another direction of the fastening element of FIG. 8.
Figure 10:
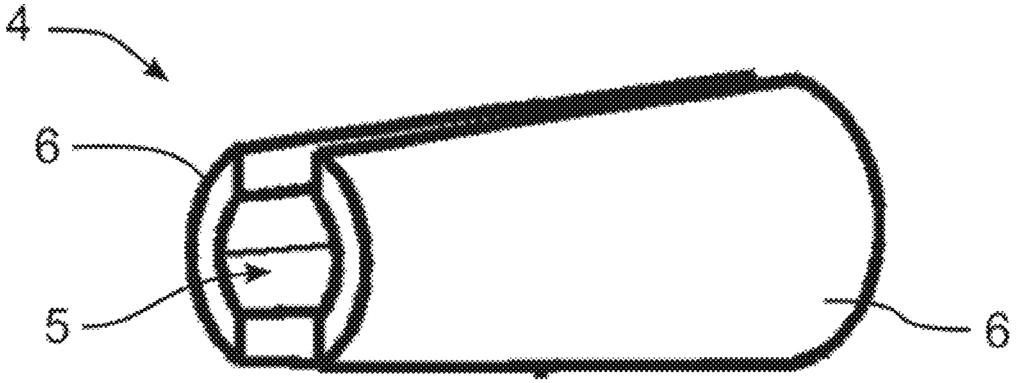
FIG. 10 schematically indicates a detailed perspective view of another of the fastening elements of FIG. 1, wherein this element comprises a protruding portion with a slot adapted for inserting a partition with a circular extension.
Figure 11:
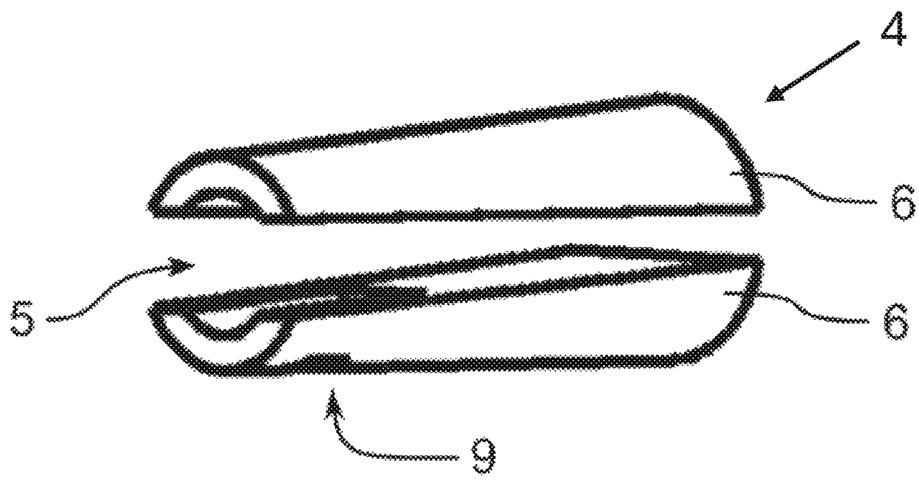
FIG. 11 is a perspective view from another direction of the fastening element of FIG. 10.
Figure 12:
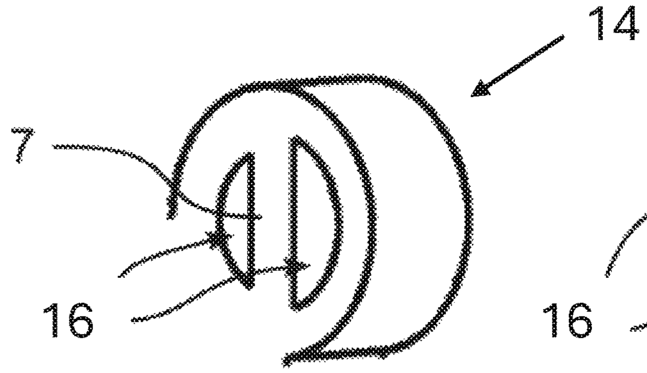
FIGS. 12 and 13 schematically indicate detailed perspective views of one of the fastening elements of FIG. 2 in two different orientations, wherein this element comprises a recessed portion with the partition with a constant width.
Figure 13:
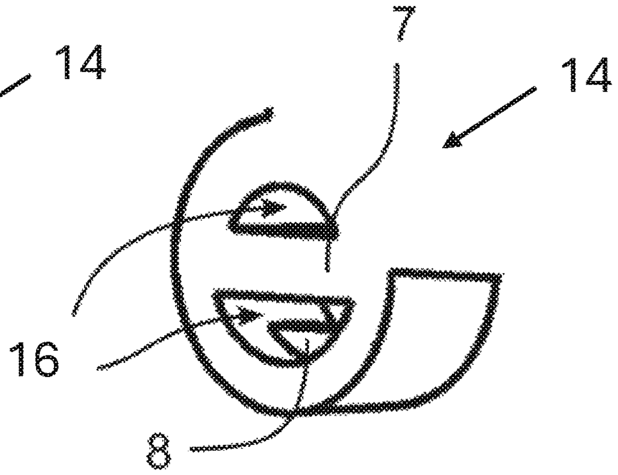
Figure 14:
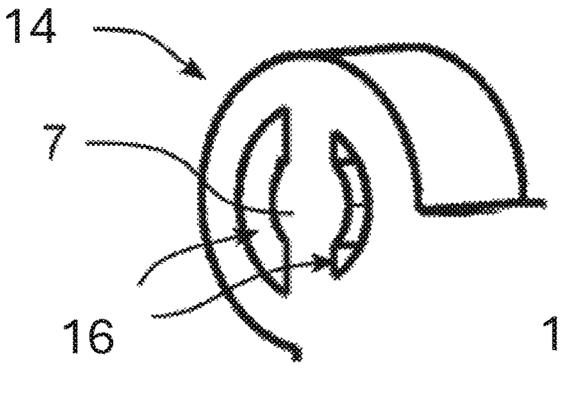
FIGS. 14 and 15 schematically indicate detailed perspective views of another of the fastening elements of FIG. 2 in two different orientations, wherein this element comprises a recessed portion with the partition with a circular extension.
Figure 15:
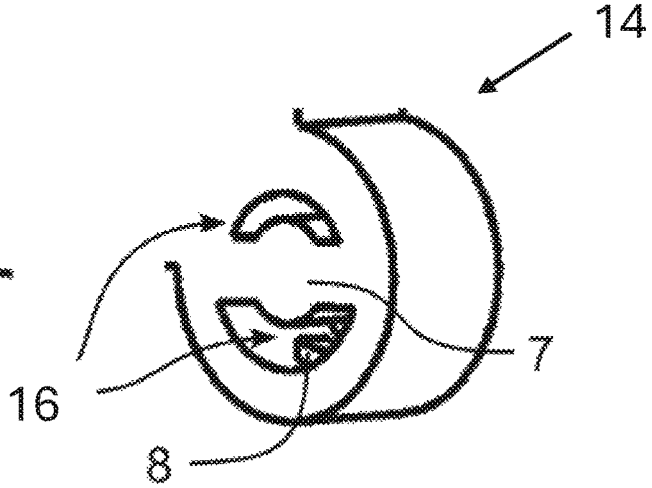

As can be seen for example in FIG. 3, the partitions 7 and thus the slots 5 are rotated differently in the different pairs 3. At the same time, two of the partitions 7 have a rectangular shape when viewed from the rear, i.e., in the direction of insertion, and the other two partitions have a partially circular shape. The corresponding slots 5 then have a corresponding shape so that the partitions 7 can be inserted into the corresponding slots 5. This different shape and rotation ensure that the first part 1 can be connected to the second part 2 only in a single, correct orientation. Connecting the parts in the wrong orientation is not possible, so inspection requirements during and after coupling are reduced and waste production is reduced. In some embodiments, however, all the partitions 7 may be equally oriented and shaped, and the correctness of the assembly may be left to the operator or may be provided by the arrangement of the fastening elements 4, 14 or the shape of another portion of the fastening elements 4, 14 or the parts to be connected. In other embodiments, the shape of the partitions 7 may be the same and only their orientation differs or vice versa. The relative rotation of the partitions 7 about an axis parallel to the direction of insertion of the fastening elements 4, 14 may be at an angle other than the 90° shown, for example 20-90°. The form of the partitions 7 and the slots 5 in the exemplary embodiment shown can be clearly seen from FIGS. 6 and 7 showing a rear view of the parts to be connected, and also from FIGS. 8 to 15 showing detailed views of the separate fastening elements 4, 14. In these detailed views, the order of the first elements 4 corresponds to the order of the complementary second elements 14 such that the complementarity of the elements from the same pair 3 and the dissimilarity between the elements from different pairs 3, including the arrangement of the protrusions 8 and the recesses 9, can be seen.

Figure 4:
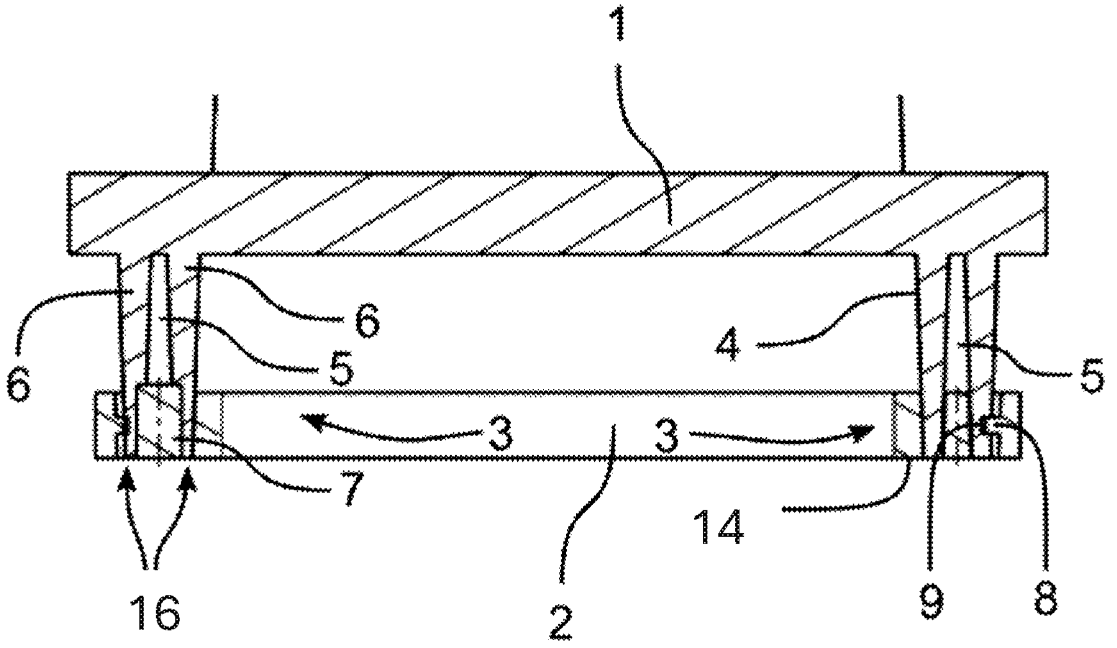
FIG. 4 shows schematically an A-A section indicated in FIG. 3, wherein this section is through two adjacent pairs of complementary fastening elements and wherein in this section the abutting of the partition on the step in the slot in one of the pairs, the engagement of the protrusion into the recess in both pairs, the narrowing shape of the protruding portions towards the free end, and the widening shape of the slots towards the open end are visible.

As can be seen from FIGS. 4 and 5, the partition 7 further serves as a stop for inserting the fastening elements 4, 14 into each other. In the embodiment shown, the slot 5 comprises a step on the circumference by which the fastening element 4, 14 with the protruding portion abuts the face of the partition 7, thereby preventing further insertion. Thus, the slot 5 narrows abruptly in the direction from the free end of the protruding portion. At the same time, at this level of insertion, the protrusion 8 engages the recess 9. In the embodiment shown, this stop is only found in pairs 3 with the partition 7 with a circular extension, but it can generally be present in any or all of the pairs 3. Furthermore, it can be seen from these figures that the recessed portion narrows slightly in the direction from the first part 1. In some embodiments, the recessed portion may narrow and the protruding portion does not have to; at the same time, the slot 5 and/or the partition 7 may narrow. In some embodiments, only the partition 7 or the slot 5 may narrow, but not the protruding portion at its outer circumference or the recessed portion at its inner circumference. At the same time, the above-described options of narrowing/widening of different parts of the fastening elements 4, 14 can be combined in different way in different pairs 3 in one assembly such that, for example, in some pair 3 the partition 7 narrows and in another the slot 5 narrows, while in another one both narrow.

In an alternative embodiment, the partition 7 may only extend into the recessed portion of the fastening element 14 but does not have to pass through the entire recessed portion and divide it into segments 16, or the recessed portion then comprises a single segment 16, which may however also be considered as two segments 16 that are in contact at a portion of their circumference. Thus, such a partition 7 is mounted on the body of the fastening element 4 at one end only, the other end being free. The protrusion 8 or recess 9 of the lock may be located on this partition 7 or on the wall of the body of the element 4 outside the partition 7. Such a partition 7 creates a preload in the segments 6 when the fastening elements 4, 14 are inserted into each other, as does the partition 7 passing across the recessed portion, as shown for example in FIG. 2. Preferably, however, the partition 7 passes across the recessed portion and divides it into separate segments 16. In some embodiments, the partition 7 does not have to be straight, as in the embodiments shown, but may be curved or bent, e.g., in the shape of the letters "L", "T", "K", "X", "V", etc. when viewed in the direction of insertion. In some embodiments, some fastening elements 14 may comprise two or more partitions 7. The chosen shape and/or number of partitions 7 also affects the complementary shape or number of slots 5.

In alternative embodiments, the first part 1 may comprise fastening elements 4 with recessed portion and the second 2 part may comprise fastening elements 14 with protruding portion. In further embodiments, each part to be connected may comprise at least one fastening element 4 with protruding portion and at least one fastening element 14 with recessed portion, i.e., in one pair 3 the element with the slot 5 is located on the first part 1 and in another pair 3 the element with the slot 5 is located on the second part 2. Alternatively or additionally, the number of pairs 3 may be different from the four shown and/or the arrangement of the pairs may be different, e.g., they may be arranged in an irregular shape instead of the rectangle as shown. In some embodiments, the arrangement of the pairs 3 may copy the shape of the parts to be connected, for example if the parts to be connected are octagonal in shape, the assembly may comprise eight pairs 3 arranged in an octagon. In general, however, the arrangement of the pairs 3 may be arbitrary, but preferably they are spread over as large an area as possible on the parts to be connected.

In some embodiments, instead of the slots 5, the partitions 7 may correspondingly narrow such that the segments 6 of the fastening element 4 are again preloaded with the protruding portion during the insertion. In some embodiments, each partition 7 may have a different shape, wherein these shapes may be, in addition to a rectangular shape and a shape with a circular extension as in the drawings, for example a shape with a square or triangular extension or, conversely, a shape with an arbitrarily shaped narrowing. In some embodiments, the widths of the entire partitions 7 may vary instead of the different shapes of the extensions in the center of the partitions 7. In further embodiments, the form of the partitions 7 may differ between the pairs 3 by the number of the segments 16 into which the partition 7 divides the recessed portion. Thus, elements in other pairs 3 may then comprise a different number of segments 6, 16. The slots 5 in the corresponding pairs 3 then have a complementary shape.

In alternative embodiments, the locks may alternatively or additionally comprise protrusions 8 on the first elements 4 and recesses 9 on the second elements 14. Alternatively, some of the fastening elements 4 on the first part 1 may comprise protrusions 8 and others may comprise recesses 9, or a single fastening element 4 may comprise both the protrusion 8 and the recess 9. The shapes of these protrusions 8 and recesses 9 may vary in different embodiments or different pairs 3, for example instead of the protrusions 8 being prismatic, they may be cylindrical, either with an axis oriented parallel or perpendicular to the direction of insertion of the fastening elements 4 into each other. Alternatively, some or all of the fastening elements 4, 14 may comprise a plurality of protrusions 8 or recesses 9. In other embodiments, the overall shape of some or all of the fastening elements 4, 14 with the protruding portion may be different. Instead of a truncated cone shape, they can have the shape of a truncated pyramid, cylinder, cuboid, prism, etc. The shape of the segments 16 of the fastening element 14 with the recessed portion corresponds to the shape of the protruding portion. In embodiments with a non-narrowing shape of the protruding portion of the fastening element 4, preferably the recessed portion of the second element 14 from the pair 3 correspondingly narrows/widens such that any clearance between the fastening elements 4 being inserted is compensated for during the insertion. Said portions of the lock may be located on the partitions 7, on the side walls of the segments 6 defining the slot 5, on the side walls of the segments 6 which do not define the slot 5 but e.g., lie opposite thereto, on the side walls of the body of the given fastening element 4, i.e., in particular on the element with the partition 7 outside the partition 7, etc.

The above alternatives and modifications can be freely combined. For example, it is possible to combine different shapes and numbers of fastening elements 4, 14 or portions thereof with different shapes and numbers of protrusions 8 and recesses 9, with different arrangements of pairs 3 on the parts to be connected, different shapes of partitions 7 can be combined with different shapes of the fastening elements 4, 14 with a protruding portion, etc.

In alternative embodiments, the first part 1 and the second part 2 may be different plastic parts for a car, for example a lens holder and a lamp or a lamp module cover, two different lamp cover components, two parts for a radiator grille or a rear-view mirror. This may include interior parts such as portions of the dashboard, center console, car radio, air conditioning, or trim.

LIST OF REFERENCE NUMBERS

1—First part
2—Second part
3—Pair
4—Fastening element (or first element)
5—Slot
6—Segment
7—Partition
8—Protrusion
9—Recess
14—Fastening element (or second element)
16—Segment

The invention claimed is:

1. An assembly for non-detachable connection of plastic parts for a car, the assembly comprising:
a plastic first part,
a plastic second part, and
at least two pairs of complementary fastening elements, wherein a first element from each pair of complementary fastening elements is rigidly connected to the first part, and a second element from each pair of complementary fastening elements is rigidly connected to the second part, and
wherein the first element from each pair of complementary fastening elements is at least partially inserted into the second element from the same pair,
wherein the first element from each pair of complementary fastening elements comprises a protruding portion and a slot dividing the protruding portion into at least two segments, each segment being defined by at least one side wall of the segment, and the second element from each respective pair comprises a recessed portion defined by at least one side wall of the recessed portion and a partition extending into the recessed portion,
wherein in each pair of complementary fastening elements the protruding portion is inserted into the recessed portion and the partition is inserted into the slot,
wherein one element from each pair of complementary fastening elements comprises in the at least one side wall of the segment, or in the at least one side wall of the recessed portion, a protrusion, and another element from the same pair comprises in the at least one side wall of the segment, or in the at least one side wall of the recessed portion, a recess complementary in shape to the protrusion,
wherein the protrusion and the recess connect the first and second elements from the pair by engaging the protrusion in the recess,
wherein the partition of a first pair of the at least two pairs of complementary fastening elements has a different shape from the partition of a second pair of the at least two pairs of complementary fastening elements when viewed along a plane perpendicular to a direction of insertion of the partition into a corresponding slot and/or the partition of the first pair is rotated relative to the partition of the second pair about an axis parallel to the direction of insertion of the partition into the corresponding slot,
wherein the slot of the first pair has a shape when viewed along the plane and/or rotation relative to the axis complementary to a shape when viewed along the plane and/or rotation relative to the axis of the partition of the first pair and non-complementary to a shape when viewed along the plane and/or rotation relative to the axis of the partition of the second pair.

2. The assembly for non-detachable connection of plastic parts of claim 1, wherein in each pair of complementary fastening elements, the partition on the second element from the pair preloads and mutually pushes apart the at least two segments of the protruding portion of the first element from the pair separated by the slot.

3. The assembly for non-detachable connection of plastic parts of claim 1, wherein the partition of the first pair is rotated relative to the partition of the second pair about the axis parallel to the direction of insertion of the partition into the corresponding slot.

4. The assembly for non-detachable connection of plastic parts of claim 1, wherein the partition of the first pair has the different shape from the partition of the second pair, wherein the slot of the first pair has the shape complementary to the shape of the partition of the first pair and non-complementary to the shape of the partition of the second pair.

5. The assembly for non-detachable connection of plastic parts of claim 1, wherein the first part and the second part are placeable to exactly one mutual position in which the partition from each pair of complementary fastening elements can be inserted into a complementarily shaped and oriented slot of the pair of complementary fastening elements.

6. The assembly for non-detachable connection of plastic parts of claim 1, wherein at least one of the first part and the second part is a component for a car lamp.

7. The assembly for non-detachable connection of plastic parts of claim 6, wherein the first part is a lens holder and the second part is a lamp lens frame.

8. The assembly for non-detachable connection of plastic parts of claim 1, wherein the partition in at least one pair of the at least two pairs of complementary fastening elements passes across the recessed portion and divides it into at least two segments.

* * * * *